Patented May 16, 1939

2,158,843

UNITED STATES PATENT OFFICE 2,158,843

AZO DYESTUFFS

Carl Taube and Otto Bayer, Leverkusen, I. G. Werk, Germany, assignors to General Aniline Works, Inc., New York, N. Y., a corporation of Delaware No Drawing. Application February 18, 1937, Serial No. 126,407. In Germany February 21, 1936

2 Claims. (Cl. 260—181)

The present invention relates to new azodyestuffs, more particularly it relates to azodyestuffs having in the free state the following formula:

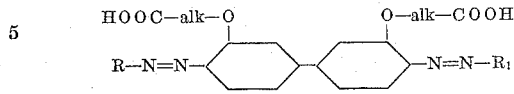

In the said formula alk stands for alkylene, R stands for the radical of 2-amino-5-naphthol-7-sulfonic acid or a derivative thereof and $R_1$ likewise stands for 2-amino-5-naphthol-7-sulfonic acid or a derivative thereof or a periaminonaphthol sulfonic acid or a derivative thereof, such as 1-amino-8-naphthol-3.6-disulfonic acid, 1-amino-8-naphthol-2.4-disulfonic acid or N-acyl, N-alkyl, N-aryl or N-aroyl substitution products of the mentioned amino naphtol sulfonic acids, such as 1-benzoylamino-8-naphthol-3.6-disulfonic acid, 1-methylamino-or ethylamino- or phenylamino-8-naphthol-3.6-disulfonic acid, 1-acetylamino-8-naphthol-2.4-disulfonic acid and the like.

Our new dyestuffs are obtainable by coupling 4.4′-diamino-diphenyl substituted in the 3.3′-positions by the group O-alk-COOH and coupling with one molecular proportion of 2-amino-5-naphthol-7-sulfonic acid or its derivatives or substitution products, as for instance 2-amino-5-naphthol-3.7-disulfonic acid, the 1-chloro-2-amino-5-hydroxynaphthalene-7-sulfonic acid or the N-aryl or N-alkyl substitution products thereof, and one molecular proportion of the same coupling components, or with a periaminonaphthol sulfonic acid or a derivative thereof.

The dyestuffs thus obtained yield when after-coppered blue shades of an excellent clearness and a very good fastness to washing, light and acids.

The invention is illustrated by the following examples:

Example 1

A hydrochloric acid tetrazo solution of diaminodiphenoxyl acetic acid obtained in the usual manner, corresponding to 5 grams of nitrite, is added drop by drop while cooling and stirring to a solution alkaline with sodium carbonate of 26 grams of 2-p-anisidylamino-5-naphthol-7-sulfonic acid. After coupling is complete the dyestuff is completely separated by addition of sodium chloride. The dyestuff having in the free state the following formula:

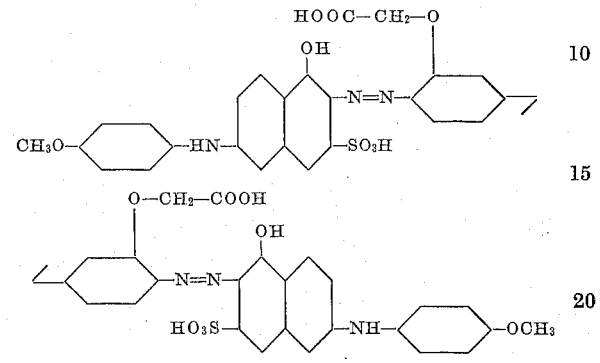

yields when dyed on cotton from a Glauber's salt bath and after-coppered blue shades of great clearness and very good fastness to washing and to light.

Similar dyestuffs are obtained by substituting the 2-phenyl, 2-meta-carboxyphenyl-, 4′-hydroxy-3′-carboxyphenyl-2-amino- or monosulfobenzidyl-2-amino-5-naphthol-7-sulfonic acid for the 2-para-anisidylamino-5-naphthol-7-sulfonic acid.

Example 2

A hydrochloric acid tetrazo solution of diaminodiphenoxyl acetic acid obtained in the usual manner, corresponding to 5 grams of nitrite, is added drop by drop while cooling and stirring to a solution alkaline with sodium carbonate of an equivalent quantity of 2-diethyl-amino-5-naphthol-7-sulfonic acid. The dyestuff isolated in the usual manner dyes cotton from a Glauber's salt bath clear blue shades, which become fast to washing when aftertreated with copper salts.

The dyestuff corresponds in its free state to the following formula:

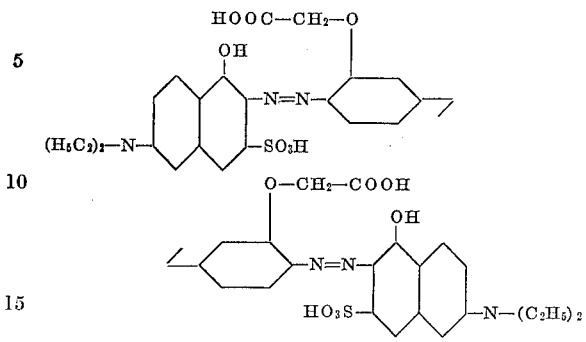

Similar dyestuffs are obtained by substituting the 2-dimethylamino-, 2-methylamino- or 2-ethylamino-5-naphthol-7-sulfonic acid for the 2-diethylamino-5-naphthol-7-sulfonic acid.

*Example 3*

A hydrochloric acid tetrazo solution of diaminodiphenoxyl acetic acid obtained in the usual manner, corresponding to 2 grams of nitrite, is coupled in a medium alkaline with sodium carbonate with the equivalent quantity of 1-chloro-2-amino-5-naphthol-7-sulfonic acid. The dyestuff isolated in the usual manner and having in the free state the following formula:

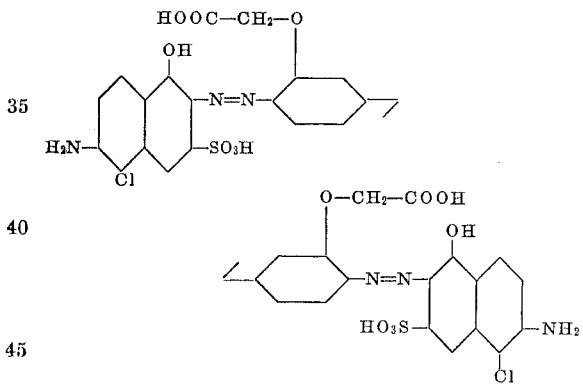

dyes cotton from a Glauber's salt bath clear blue shades, which become fast to washing when aftertreated with copper salts.

Similar dyestuffs are obtained by coupling the diaminodiphenoxyl acetic acid with 2-amino-5-naphthol-7-sulfonic acid or 2-amino-5-naphthol-3.7-disulfonic acid.

We claim:

1. Azodyestuffs having in the free state the following formula:

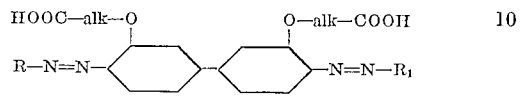

wherein alk stands for an alkylene group, R stands for a member selected from the group consisting of 2-amino-5-naphthol-7-sulfonic acid and N-acyl, N-alkyl, N-aryl, N-aroyl derivatives and halogen substitution products thereof, and $R_1$ stands for a member selected from the group consisting of 2-amino-5-naphthol-7-sulfonic acid, periaminonaphthol sulfonic acids and substitution products and derivatives thereof, yielding in general on vegetable fibers when aftercoppered blue shades of good fastness to washing, light and acids.

2. The azodyestuff having in the free state the following formula:

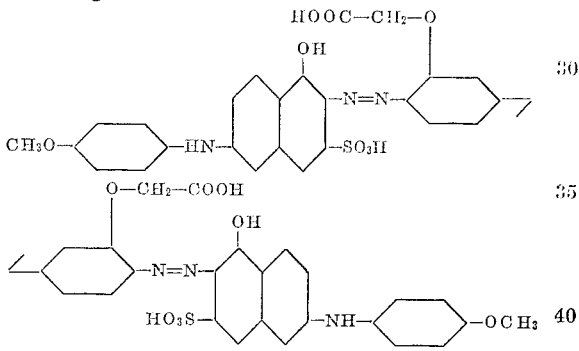

yielding on cotton when aftercoppered blue shades of great clearness and very good fastness to washing and to light.

CARL TAUBE.
OTTO BAYER.